May 3, 1938.  I. TSUCHIYA  2,116,291
LAWN RAKE
Filed May 10, 1937     2 Sheets-Sheet 1
Fig. 1.
Fig. 2.
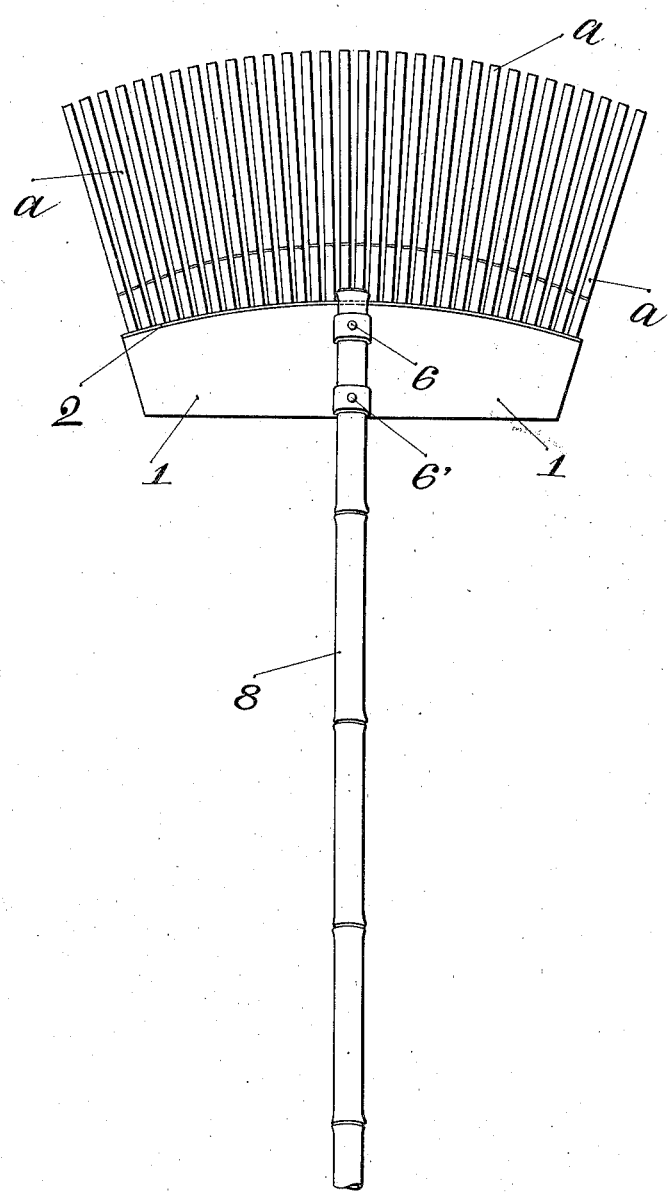
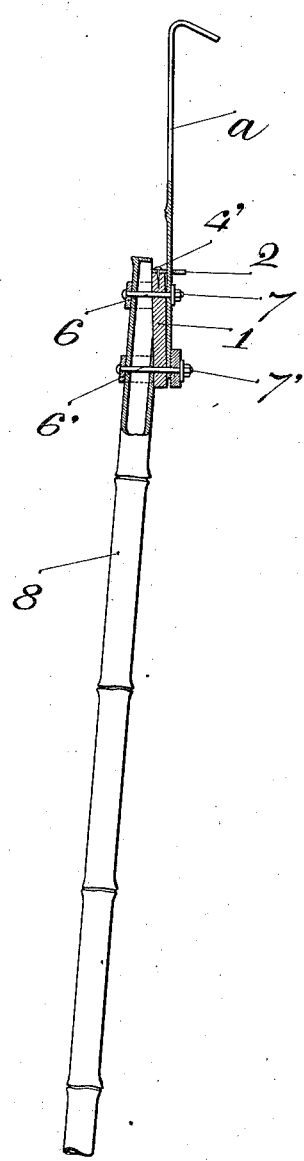
I. Tsuchiya
Inventor
By: Glascock Downing & Seebold
Attys.

May 3, 1938.  I. TSUCHIYA  2,116,291
LAWN RAKE
Filed May 10, 1937   2 Sheets-Sheet 2

I. Tsuchiya
Inventor
By: Glascock Downing & Seebold
Attys.

Patented May 3, 1938

2,116,291

UNITED STATES PATENT OFFICE 2,116,291

LAWN RAKE

Inosuke Tsuchiya, Furocho, Dairi, Moji, Fukuoka-ken, Japan

Application May 10, 1937, Serial No. 141,855
In Japan September 30, 1936

2 Claims. (Cl. 55—114)

My invention relates to an improved construction of a lawn rake.

The essential portions of the rake i. e. the scraping teeth or the handle are made of bamboos which have considerable strength and tenacity so that the rake is adequately fit for raking, sweeping, scraping, etc.

The handle and scraping teeth are connected together by wooden boards and securely fastened by bolts and nuts and at the same time they may be easily and simply removed and replaced when desired.

The rake teeth are fastened to wooden boards on their fixed ends, and on the free ends, they are bent as shown on drawings.

The bent ends are thoroughly fit for scraping and sweeping on account of the general characteristic nature of bamboos.

The objects of the invention, are to provide a rake of simple and durable construction which can be manufactured at a low price; to provide a rake in which the bamboo rake teeth can be easily and simply secured to or removed from bamboo handles; and to provide a rake in which any broken teeth can be easily removed and replaced by new ones.

These objects and other advantages, which will hereinafter appear, I attain by means of the construction illustrated in preferred form in the accompanying drawings, wherein:—

Fig. 1 is an elevation of my improved rake.

Fig. 2 is a side view of the rake, partly in elevation and partly in section.

Figure 3:
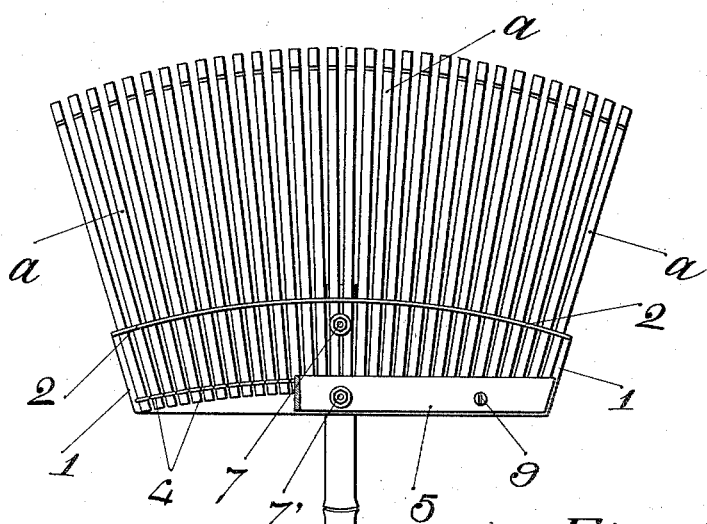
Fig. 3 is an elevation seen from rear side.
Figure 4:
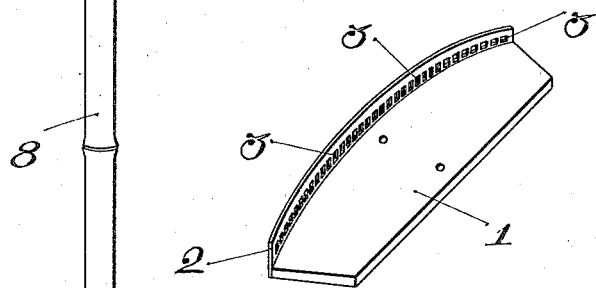
Fig. 4 is a perspective view of wooden board to which each of the bamboo rake teeth, is to be secured.
Figure 5:
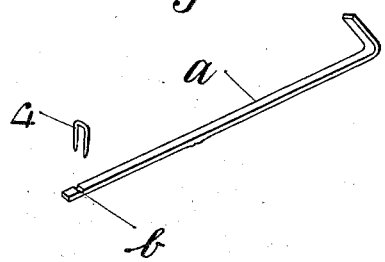
Fig. 5 shows one of the rake teeth and U shaped clips for fastening these teeth to the wooden board both in perspectives.

To the arc side of the fan shaped wooden board I, a curved metal sheet 2 is secured by means of clips 4' in such manner as to show, above the wooden board. The sheet 2 is provided with several orifices 3 through which the bamboo rake teeth pass.

These rake teeth $a$ are provided with notches $b$ and the notched ends are passed through the orifices to thus be arranged in fan shape as shown on drawings. These teeth are fastened to the board I by means of U shaped clips 4 which engage the notches cut near the ends of the rake teeth.

The fixed ends of the rake teeth $a$ are covered and protected by wooden board 5 and the teeth are fastened to the board 5 and the handle 8 by means of bolts 6, 6' and nuts 7, 7' so that the rake teeth are simply and easily secured or removed.

The numeral 9 on drawings indicates the fastening screw of the wooden board 5.

It will be seen that, the bamboo rake teeth $a$ provided with notches $b$ are made to go through the orifices 3 of the metal sheet 2 and arranged in fan shape. The notched portions are secured to wooden board by means of U shaped clips 4 and the board 5 is also made to protect the rake teeth and secure them in position by bolts 6, 6' and nuts 7, 7' in such manner as to be able to easily secure or remove them.

From the foregoing it will be seen that the rake teeth are simply and easily taken off and also securely fixed by U shaped clips as explained; they do not easily move and well maintain the shapes and positions.

In case one or some teeth are damaged and have to be replaced or even in case the entire set of teeth are to be replaced, the operation can be done quite simply and easily.

Having thus described my invention and illustrated its use, what I claim as new and desire to secure by Letters Patent, is the following:

1. In a rake, a plurality of bamboo rake teeth, each of said teeth having a notch adjacent one end thereof, a board having an arcuate shaped edge, means arranged along said edge for spacing said rake teeth, means for securing each rake tooth to one side of said board comprising a U-shaped clip engaging each of said rake teeth within the notch thereof, a second board arranged over the attached ends of said rake teeth, and means for clamping the ends of the rake teeth between said boards.

2. A lawn rake comprising, a plurality of bamboo rake teeth, each of said teeth having a notch adjacent one end thereof, a board having an arcuate shaped edge, a sheet member arranged along and secured to the arcuate edge of said board, said sheet having orifices therein adapted to respectively receive each rake tooth to provide spacing thereof, means for attaching each rake tooth to one face of said board comprising a U-shaped clip engaging each of said rake teeth within the notch thereof, a second board positioned over the attached ends of said rake teeth, a handle having the end thereof arranged adjacent the opposite surface of said first board, and bolts for clamping the ends of the rake teeth between said boards and for securing the rake handle to said boards.

INOSUKE TSUCHIYA.